(12) United States Patent
Vine (10) Patent No.: US 12,352,660 B2
(45) Date of Patent: Jul. 8, 2025

(54) SYSTEM AND METHOD FOR DETECTING BREACHES IN CONTAINERS

(71) Applicant: ISHIDA EUROPE LIMITED, Birmingham (GB)

(72) Inventor: Lee Vine, Poole (GB)

(73) Assignee: ISHIDA EUROPE LIMITED, Birmingham (GB)

( * ) Notice: Subject to any disclaimer, the term of this patent is extended or adjusted under 35 U.S.C. 154(b) by 360 days.

(21) Appl. No.: 17/794,880

(22) PCT Filed: Jan. 21, 2021

(86) PCT No.: PCT/GB2021/050130
§ 371 (c)(1),
(2) Date: Jul. 22, 2022

(87) PCT Pub. No.: WO2021/148790
PCT Pub. Date: Jul. 29, 2021

(65) Prior Publication Data
US 2023/0076074 A1 Mar. 9, 2023

(30) Foreign Application Priority Data
Jan. 24, 2020 (GB) .................................. 2001029

(51) Int. Cl.
*G01M 3/38* (2006.01)
*G01M 3/04* (2006.01)

(52) U.S. Cl.
CPC ................ *G01M 3/38* (2013.01); *G01M 3/04* (2013.01)

(58) Field of Classification Search
None
See application file for complete search history.

(56) References Cited

U.S. PATENT DOCUMENTS

| 6,427,524 B1 | 8/2002 | Raspante et al. |
| 2019/0178745 A1 | 6/2019 | Hann et al. |

(Continued)

FOREIGN PATENT DOCUMENTS

| EP | 2686657 B1 * | 11/2019 | .............. G01M 3/22 |
| JP | 2007108101 A * | 4/2007 | |

(Continued)

OTHER PUBLICATIONS

International Search Report and Written Opinion of the International Searching Authority issued in PCT International Application No. PCT/GB2021/050130 mailed Apr. 14, 2021.

(Continued)

*Primary Examiner* — Herbert K Roberts
(74) *Attorney, Agent, or Firm* — SQUIRE PATTON BOGGS (US) LLP (57) ABSTRACT

A leak detection system for detecting breaches in sealed food containers is disclosed. The leak detection system comprises a first optical sensor configured to transmit a light signal across a first testing path, said first optical sensor being sensitive to gas composition variations. A permeable pressing member is configured to, in use, apply pressure to the sealed food container. The first optical sensor is arranged such that at least a portion of the first testing path along which the light signal is transmitted is located behind or within the permeable pressing member.

21 Claims, 3 Drawing Sheets

(56) References Cited

U.S. PATENT DOCUMENTS

2020/0191713 A1* 6/2020 Lewander Xu ........ G01N 21/39
2021/0048365 A1* 2/2021 Lundin .................. G01M 3/38

FOREIGN PATENT DOCUMENTS

| JP | 2017-15694 A | 1/2017 | |
|----|----|----|----|
| JP | 2019-515297 A | 6/2019 | |
| WO | WO 2003/087787 A1 | 10/2003 | |
| WO | WO-2017191465 A2 * | 11/2017 | ........... B07C 5/3404 |
| WO | WO 2019/076838 A1 | 4/2019 | |
| WO | 2019/170784 A1 | 9/2019 | |

OTHER PUBLICATIONS

Notice of Reasons for Refusal dated Dec. 3, 2024 issued in corresponding Japanese Patent Application No. 2022-545085, with English language translation thereof.

First Office Action dated Dec. 25, 2024 issued in corresponding Chinese Patent Application No. 202180017174.7, with English language translation thereof.

* cited by examiner

SYSTEM AND METHOD FOR DETECTING BREACHES IN CONTAINERS

CROSS-REFERENCE TO RELATED APPLICATIONS

This application is a national-stage filing under 35 USC 371(c) of International Application No. PCT/GB2021/050130, filed Jan. 21, 2021, which claims priority to, and the benefit of, Great Britain Patent Application GB2001029.4 filed Jan. 24, 2020, the entire contents of each of which are herein incorporated by reference in their entirety for all purposes.

FIELD OF THE INVENTION

The present invention relates to systems and method for detecting breaches in sealed containers, in particular sealed modified-atmosphere food containers, such as trays and packets.

BACKGROUND TO THE INVENTION

Modified atmosphere packaging (MAP) is widely practiced in the food packaging industry as a way of reducing spoilage of produce and increasing shelf life. MAP typically comprises modifying the composition of the gas that is present alongside food product in a food container so that it is different from the standard atmospheric composition in a way which maximises the longevity of the food product. This will typically involve increases and decreases of the proportion of oxygen, nitrogen and/or carbon dioxide in the atmosphere within food packages.

When food is packaged using modified atmosphere packaging, any incomplete sealing of the packaging reduces or nullifies entirely the increased shelf life provided by the MAP process as the atmosphere within the package is allowed to return to standard atmospheric composition.

In order to try to identify containers which have a breach, i.e. an opening into the package which renders them incompletely sealed, packages are mechanically tested. Mechanical testing typically comprises mechanically squeezing the container and identifying an expected response as the pressure within the sealed package increases and the package resists the mechanically squeezing. Such methods of mechanically testing packages are typically very slow, which can limit the maximum production speed, or require many separate lanes to keep up with faster packaging systems. Furthermore, mechanical systems are typically limited in the size of leak detectable, with breaches of 1.0 mm or less often being undetectable.

Laser technology has recently been developed which can accurately and precisely identify, for example, its carbon dioxide content. Such laser technology is based on a principle called tunable diode laser absorption spectroscopy (TDLAS), which measures the concentration of species in gaseous mixtures using tunable diode lasers and laser absorption spectrometry. Compared to other measurement techniques, such as paramagnetic detectors ("PMD") and Chemi-luminescence, TDLAS offers multi-element detection capabilities, high accuracy with a wide dynamic range, low maintenance requirements, and a long life cycle. The use of lasers as spectroscopic light sources allows for high resolution spectroscopy (HRS), with quantum cascade lasers (QCLs) offering access to the valuable mid infrared (MIR) part of the electromagnetic spectrum. An example of a QCL system may be found in WO 03087787 A1.

This type of technology has been integrated into in-line systems for detecting breaches in food containers, as detailed in WO19076838 A1. Here, a laser beam is arranged to extend directly over the food container to detect expelled gas as an adjacent roller or the like compresses the container. This has been found to provide reasonably reliable leak detection. In theory, the sensitivity of optical techniques is such that breaches of less than 1.0 mm could now be detectable; however, it has been found that this implementation is not taking full advantage of this high sensitivity. It is therefore desirable to provide improved integration of this technology in order to further increase the reliability and efficiency of this relatively new leak detection technology.

SUMMARY OF THE INVENTION

In accordance with a first aspect of the invention, there is provided a leak detection system for detecting breaches in sealed food containers, the leak detection system comprising: a first optical sensor configured to transmit a light signal across a first testing path, said first optical sensor being sensitive to gas composition variations (i.e. of the gas impinging on light signal transmitted along the testing path); and a permeable pressing member configured to, in use, apply pressure to the sealed food container; wherein said first optical sensor is arranged such that at least a portion of the first testing path along which the light signal is transmitted is located behind or within the permeable pressing member.

In this system, a permeable pressing member is provided, which is configured to apply pressure to the sealed food container, for example with a pressing surface of the pressing member. Such a permeable pressing member allows gas to pass through the pressing surface of the pressing member. This ensures that, for example, gas expelled from a container as pressure is applied may pass through the pressing surface of the pressing member, either to the interior or to the rear of the pressing member. Further, the first optical sensor is arranged such that at least a portion of the first testing path is located behind or within the permeable pressing member. For example, the testing path may be arranged behind the pressing surface of the pressing member, i.e. relative to the side of the pressing surface that comes into contact with the sealed food, or may be arranged within the permeable pressing member, with the container coming into contact with an exterior surface of the pressing member. Accordingly, gas that permeates through the pressing member may impinge upon the light transmitted along the testing path, such that it alters the optical characteristics of the transmitted light in the manner described above.

This system provides that the testing path may be located closer to the contact point between the pressing member and the sealed food contained. In the known systems, when pressure is applied to sealed food containers, this may cause them to bulge or inflate on either side of the contact point. This is particularly problematic where the sealed food container is a bag of food product. Because of this effect, the known systems have to provide sufficient clearance between the beam path and the sealed food container such that the container itself cannot impinge upon the testing path and block the transmitted light. Indeed, the present inventors found that the known systems, in which detection is performed at the leading or trailing edge of a roller, suffers a significant drop in sensitivity as a result of the optical sensor being laterally offset from the pressing location. In the present system, the testing path is behind or within the pressing member such that the pressing member itself prevents the container from blocking the testing path and allows for the sensor to be arranged as close as possible to the contact point with the container. Positioning the testing path closer to the contact point with the sealed food container improves sensitivity and reliability of the leak detection process.

As mentioned above the first optical sensor is sensitive to gas composition variations. For example, the optical sensor may be sensitive to variations in the proportion of carbon dioxide or nitrogen in the air impinging on the testing path. This provides that if a breach is present in a modified-atmosphere container, the pressing member may cause gas to be expelled from the container, which will cause a spike or drop in the proportion of one or more gasses in the vicinity of the testing path. The optical sensor is thereby able to detect this change in gas composition, from which it may be inferred that there is a breach in the sealed food container.

The first optical sensor may transmit light along a substantially one-dimensional testing path, e.g. a laser beam path, but the path could also extend in two dimensions, e.g. a line-focused laser could illuminate a plane, if it is desired to provide a wider testing region. However, it is preferred that the testing path does not exceed the length of the containers to be tested, to ensure that it can be determined which container has a breach. For this reason, a laser beam may be preferred, to provide high precision.

Preferably, the system further comprises a conveyor for conveying a sealed food container through the leak detection system. For example, the conveyor may convey the sealed food container on a conveyor belt past the pressing member. Here, at least a portion of the pressing surface of the pressing member may be arranged between the testing path and the conveyor.

The pressing member may advantageously be configured to apply pressure to the sealed food container while said sealed food container moves through the leak detection system, e.g. while it is moved by the previously mentioned conveyor. This ensures that the sealed food container does not need to be halted for the testing process, which improves throughput of the system. Examples of suitable pressing members will be given below, but generally the pressing members will require a movable or rotatable pressing surface for contacting the sealed food containers as it moves through the system.

In preferred embodiments, the permeable pressing member is arranged opposite the conveyor such that a sealed food contained may pass between the permeable pressing member and the conveyor. That is, for example, the conveyor may move the sealed food container through the system and bring the sealed food container into a gap between the permeable pressing member and the conveyor, which causes the pressure in the sealed food container to rise as it moves through this gap.

Preferably, the system further comprises a control unit coupled to the first optical sensor, the control unit receiving a signal of the first optical sensor and determining the presence of a breach in a sealed food container based on the signal of the first optical sensor. For example, the control unit may determine that there is a breach in the sealed food container once one or more threshold values are exceeded for one or more gases to which the optical sensor is sensitive. Alternatively, the determination may be based on a rate of change of gas composition.

In some embodiments, the control unit is configured to receive information concerning the location of the sealed food container relative to the first optical sensor, and the control unit is configured to determine the location of a breach in the sealed food container based on the signal of the first optical sensor and the information concerning the location of the sealed food container. The information concerning the location of the sealed food container may come from a light gate arranged to detect the leading and trailing edges of a container as it passes beneath the pressing member and optical sensor. In other example, sensors such as weighing sensors or cameras or the like may be used to establish the location of a container within the system or upstream of the system. The controller may also be coupled to the conveyor and may use the speed of the conveyor to track a container location as it moves through the system. Determining the location of a breach is helpful for identifying faults in the upstream sealing machinery. For example, if breaches are regularly being found in the trailing edge of a container, this may be used to identify the source of a sealing error, such as debris in the corresponding end of a sealing tool.

In many embodiments, the control unit is configured to determine a magnitude (i.e. the size) of a breach based on the signal of the first optical sensor. For example, the signal of the optical sensor may be used by detecting the peak gas composition variation, or by detecting the rate of change of gas composition, and inferring from one or both of these the size of the container breach. This may be calibrated by using sample containers with varying breach sizes to determine typical gas composition variation profiles for different breach sizes. The controller may decide whether a container is "good" or "bad" based on the determined magnitude of the breach. For example, very small breaches may be within acceptable tolerances for sealed food containers. Nevertheless, being able to detect and monitor the occurrence of small breaches may still be valuable for identifying problems in the sealing machinery.

In particularly preferred embodiments, the permeable pressing member comprises a first permeable conveyor belt. This permeable conveyor belt may be arranged over and opposing the previously mentioned conveyor such that the sealed food container may pass between the two conveyors to cause the increase in pressure. Advantageously, a permeable conveyor belt facilitates the provision of the testing path within the pressing member. That is, the testing path may extend within the conveyor belt, e.g. between the opposing sides of the conveyor belt.

Preferably, the first permeable conveyor belt comprises an array of openings through the conveyor belt for permitting gas to permeate through the conveyor belt. For example, the conveyor belt may have an array of holes or slots through the belt, which would allow gas to pass through and impinge upon the testing path.

The first permeable conveyor belt may also comprise an array of elements that project away from the surface of the conveyor belt, i.e. the pressing surface, for contacting the sealed food container and separating a body of the conveyor belt, i.e. the bulk of the belt, from the surface of the sealed food container. An array of projecting elements reduces the contact area between the pressing member and the container to prevent the pressing member from inadvertently blocking any breach in the container. Suitable projecting elements may include bumps or elongate ridges.

In particularly preferred embodiments, the first optical sensor is arranged such that at least a portion of the testing path is located within the first permeable conveyor belt and extends across the width of the conveyor belt, i.e. across the direction perpendicular to its direction of conveyance. This will typically provide a convenient location for the physical elements of the first optical sensor, i.e. at the lateral openings of the entrained conveyor belt, while allowing the testing path to span all or the majority of the possible contact locations.

While a first permeable conveyor belt is preferred in some embodiments, in other embodiments, the permeable pressing member may comprise, for example, a permeable roller.

In embodiments in which a conveyor is provided for conveying the sealed container to and/or from the permeable pressing member, preferably the conveyor comprises a permeable conveyor, and wherein the first optical sensor or a second optical sensor sensitive to gas composition variations is configured to transmit a second light signal across a second testing path, wherein said optical sensor is arranged such that at least a portion of the second testing path along which the second light signal is transmitted is located behind or within the permeable conveyor. Essentially, in these embodiments, the lower conveyor, on which the container sits during conveyance, also acts as a pressing member for extracting a gas sample through breaches in the container. This is particularly preferred where the sealed food container is configured to be sandwiched between the conveyor and the permeable pressing member, i.e. when the sealed container passes through a gap defined between the two.

Preferably, the permeable conveyor comprises a second permeable conveyor belt. The second permeable conveyor belt may have all of the features described above with respect to the first permeable conveyor belt, i.e. openings, projecting elements and arrangement of the testing path. For example, the optical sensor may also be arranged such that at least a portion of the second testing path is located within the second conveyor belt and extends across the width of the conveyor belt.

As indicated above, the second testing path could be formed by the same optical sensor that provides the testing path in the permeable pressing member. This may be provided by an arrangement of mirrors, e.g. for directing the light down and across within the second conveyor belt so that only one path of light is provided extending along both sides of the container, which is then received at a single optical detector that measures the received light signal. Alternatively, the second testing path could be provided by a second optical sensor different to the first optical sensor. This may help identify which side of the container the breach is located, which could help with diagnosing sealing or other manufacturing faults. There may be provided two light sources for transmitting light along the two paths, or one light source with the light being split into the two paths and received at respective optical detectors.

In embodiments in which a second optical sensor is used, preferably the first optical sensor is sensitive to gas composition variations in the first testing path and the second optical sensor is sensitive to gas composition variations in the second testing path. For example, the light signal along the first testing path may be separate from the light signal along the second testing path, and these light signals may be received by respective optical detectors sensitive to the light signal transmitted by the light source. Preferably, a control unit is coupled to the second optical sensor and is configured to receive a signal from the second optical sensor, and the control unit is configured to determine the location of a breach based on the signal from the first optical sensor and the signal from the second optical sensor. As mentioned above, this allows discrimination between breaches in the top and bottom of the sealed food container, for example. The control unit may be configured to determine the location of a breach by comparing the signal from the first optical sensor and the signal from the second optical sensor. For example, if the gas composition variation is greater for one sensor than the other, or detected by one sensor and not the other, this may be used to infer that the breach is located in or towards the side of the container proximate that sensor.

In particularly preferred embodiments, the permeable pressing member is adjustably mounted over the conveyor such that a distance between the pressing member and the conveyor may be varied in order to accommodate different dimensions of sealed food containers. While preferred, in alternatives, the two could be fixed relative to one another.

In many embodiments, the optical sensor is mounted to said permeable pressing member. For example, the optical sensor may be mounted within a permeable conveyor belt. This aids in particular with adjusting the positioning of the pressing member. Where a second optical sensor is provided in a permeable conveyor, this may be likewise mounted to said conveyor, e.g. within the second conveyor belt.

Preferably, the optical sensor(s) comprise one or more light sources, preferably a laser, configured to transmit the light signal and wherein each optical sensor comprises a detector sensitive to the light signal transmitted by said light source. As mentioned above, two optical sensors will be characterised by respective detectors for receiving the light after it has passed across the respective testing path and detecting gas composition variations. The light may, however, be transmitted by one and the same light source, e.g. using a splitter, or may be transmitted by respective light sources.

According to a second aspect of the invention, there is provided a method of detecting breaches in sealed food containers, the method comprising: applying pressure to a sealed food container using a permeable pressing member; detecting a variation in gas composition behind or within the permeable pressing member using an optical sensor configured to transmit a light signal across a testing path; wherein said optical sensor is arranged such that at least a portion of the testing path along which the light signal is transmitted is located behind or within the permeable pressing member.

This corresponds to a method of using the system according to the first aspect and so all preferred features of that system apply equally to the method according to the second aspect.

As explained above, one advantage of the present invention is that it allows more precise determination of the size and/or location of a breach in a container and so preferably this method involves making a determination as to the size and/or location of the breach.

For example, the method may comprise determining a magnitude of a breach in the sealed food container based on the variation in gas composition detected using the first optical sensor. This may be based on the detected size of variation or the rate of change of gas composition, as explained above.

Preferably, pressure is applied to the sealed food container using a permeable pressing member while said sealed food container moves relative to the first optical sensor, and the method further comprises determining a location of a breach in the sealed food container based on the detected variation in gas composition and the location of the sealed food container relative to the first optical sensor.

Preferably, the method further comprises detecting a variation in gas composition using a second optical sensor configured to transmit a light signal across a second testing path, wherein the sealed food container is located or passes between the first and second testing paths, and further comprises determining a location of a breach in the sealed food container based on the variation in gas composition detected by the first optical sensor and the variation in gas composition detected by the second optical sensor. That is, the two sensors may be used to determine whether a breach is closer to the first or the second optical sensor and so indicate whether the breach is in, for example, the top or bottom of the container.

DETAILED DESCRIPTION

A first embodiment of a leak detection system will now be described with reference to FIGS. 1-4.

Figure 1:
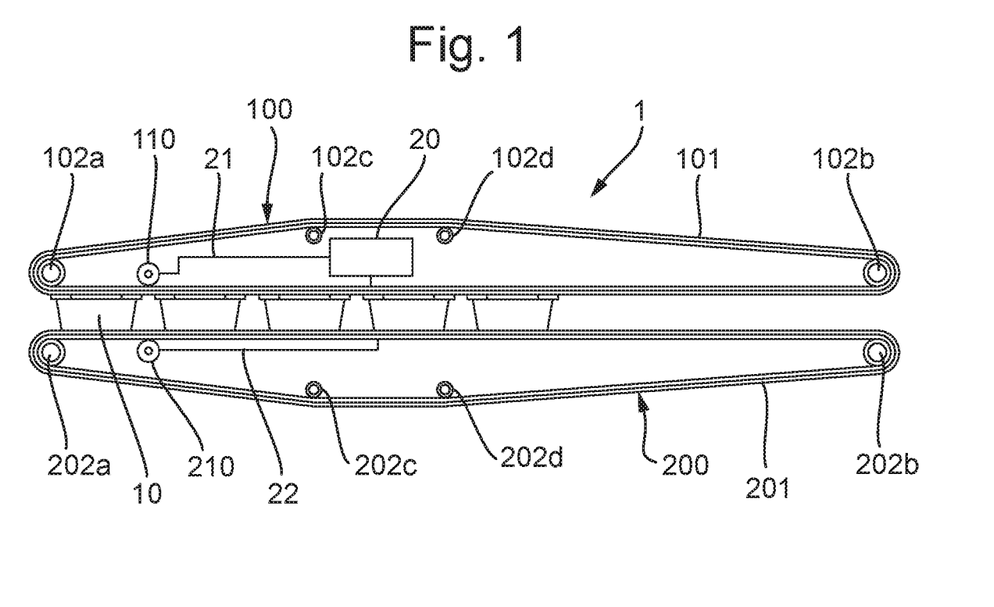
FIG. 1 shows a side view of a leak detection system according to an embodiment.

The leak detection system 1 comprises first and second opposing conveyors systems 100, 200. The upper conveyor 100 comprises a conveyor belt 101 entrained about a series of rollers 102a, 102b, 102c, 102d. The drive rollers 102a, 102b are positioned at the upstream and downstream ends of the conveyor 100 and determine the length of the conveyor, while auxiliary rollers 102c, 102d are provided to adjust the shape of the entrained conveyor belt 101. In particular, the conveyor belt 101 is entrained about the rollers 102a, 102b, 102c, 102d such that the lower surface of the conveyor belt is substantially flat, i.e. the drive rollers 102a, 102b are positioned at the same height and the lower surface extends between the drive rollers 102a, 102b without changing direction. The upper surface of the conveyor belt, on the other hand, passes around auxiliary rollers 102c, 102d, located towards the centre of the conveyor, which act to space the upper surface of the conveyor from the flat lower surface. This increases the clearance between the upper and lower surfaces of the conveyor belt 101, and provides space for internal components, which will be discussed further below. While only these rollers are shown in this embodiment, it will be appreciated that additional entraining rollers may be provided as required for supporting and maintaining the shape of the conveyor belt.

The second conveyor 200 similarly comprises a conveyor belt 201 entrained about rollers 202a, 202b 202c, 202d. First and second drive rollers 202a, 202b again are positioned at the upstream and downstream ends of the conveyor 200 and determine the length of the conveyor. The rollers 202a and 202b provide the second conveyor 200 with a substantially flat upper surface, while the auxiliary rollers 202c, 202d space the lower surface of the belt from the upper surface in order to provide space inside the conveyor for internal components. Again, additional rollers may be provided as required. In particular, since this conveyor 200 may support items being conveyed through the system, additional rollers along the length of the conveyor supporting the upper surface of the conveyor belt 201 may be required.

As mentioned above, the conveyors 100 and 200 oppose one another. The flat lower surface of the upper conveyor 100 and the flat upper surface of the lower conveyor 200 provide that a gap of substantially constant height is defined between the two opposing conveyor systems 100, 200. In use, a tray 10 is conveyed towards the leak detection system 1 by an upstream conveyor (not shown) such that the tray enters between the opposing conveyors 100, 200 at an upstream end of the system 1. The two conveyors 100, 200 are driven by the respective sets of drive rollers 102a, 102b, 202a, 202b so that the belts 101, 102 act to convey a tray 10 through the system. This movement of the two conveyor belts 101, 201 causes a tray 10 to be drawn into the gap between the two conveyors 100, 200, where it is compressed by the opposing conveyor belt surfaces.

Figure 2:
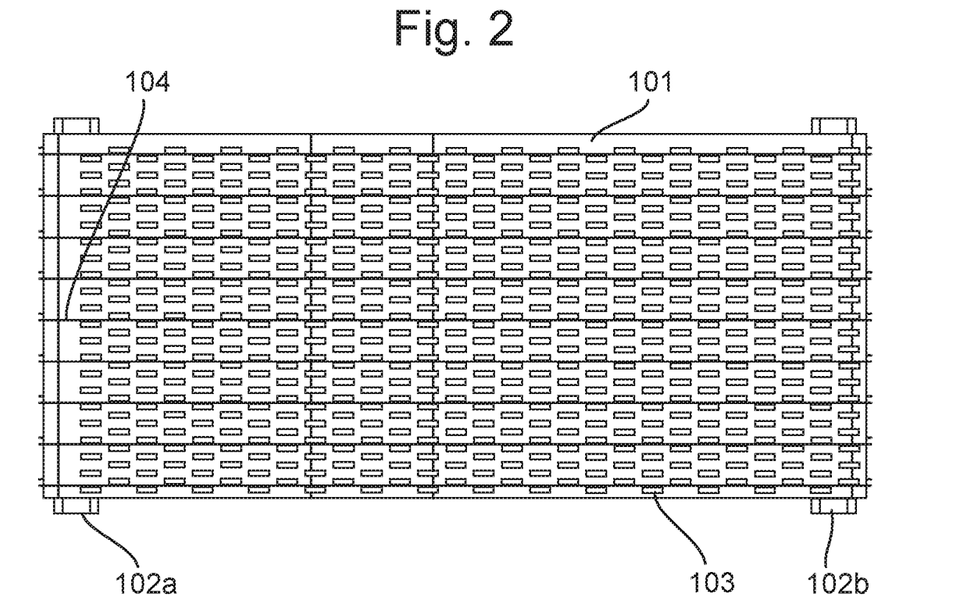
FIG. 2 shows a top view of the leak detection system shown in FIG. 1.

As shown in FIG. 2, the first conveyor belt 101 comprises a series of openings through the belt in the form of an array of slots 103. These slots 103 permit gas to pass through the conveyor belt surface 101. In particular, as the tray 10 is compressed, the modified atmosphere located within the tray may leak through a breach in the container and be allowed to pass through one of the slots 103. While not shown, the second conveyor system 200 similarly includes a conveyor belt 201 with a similar array of openings for permitting the permeation of gas.

Figure 3:
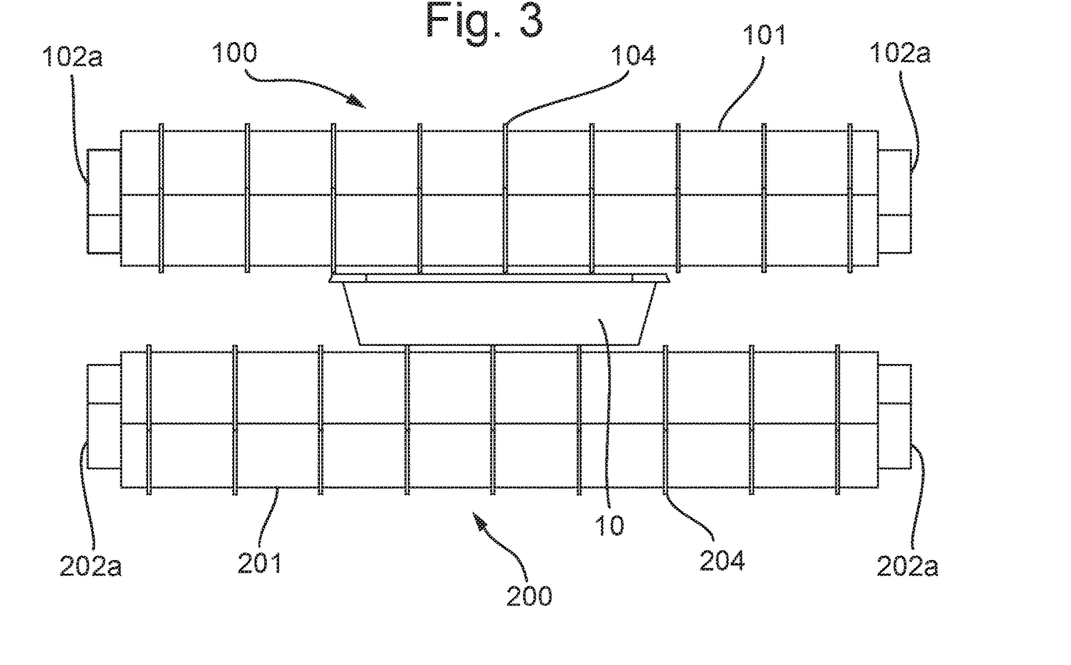
FIG. 3 shows an end view of the leak detection system shown in FIGS. 1 and 2.

As shown in FIG. 3, each conveyor belt 101, 201 also comprises a series of projecting ridges 104, 204, that extend along the conveying direction of the conveyor belt. As can be seen in FIG. 3, these projecting ridges 104, 204 minimise the contact area between the conveyor belts 101 and 201 and the tray 10. This minimisation of contact area ensures that the surface of the conveyor belt 101, 102 does not inadvertently block any breaches in the sealed food containers 10.

Figure 4:
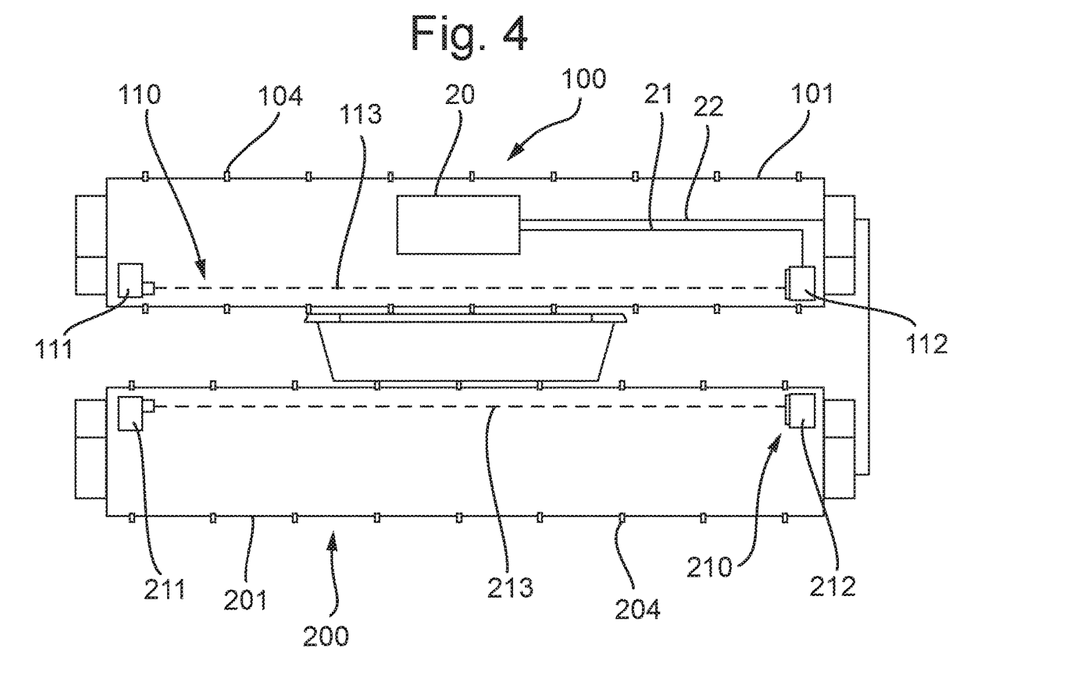
FIG. 4 shows an end view of the leak detection system shown in FIGS. 1 to 3 with the conveyor belts being omitted to reveal the positioning of the optical sensors.

As shown in FIGS. 1 and 4, the first and second conveyor systems 100, 200 include a respective optical sensor 110, 210 located between the upper and lower surfaces of the respective conveyor bels 101, 201. Both optical sensors 110, 120 are located towards the upstream end of the conveyor. This ensures that, as the container 10 enters between the conveyors and is subject to applied pressure, the optical sensors are appropriately located to detect gas expelled before a significant amount of gas has escaped. This improves the sensitivity of the system. The first optical sensor 110, located in the first conveyor 100, comprises a light source 111 and a detector 112. The light source 111 may be a laser such as a diode laser or a semiconductor laser. The wavelength(s) or wavelength range selected for the light source should match the absorption spectra of at least one of the gases located inside the modified atmosphere tray 10. Preferably, the wavelength(s) should be selected to match the absorption spectra of the gas in the container whose proportion differs greatest from that of ambient air. The detector 112 may be any optical detector able to detect the wavelengths or wavelength range selected for the light source 111 and may be, for example, a photo diode, a photo multiplier, a CCD detector, a CMOS detector or an InGaAs detector.

The light source 111 is arranged at one lateral edge of the conveyor and is configured to transmit a light signal 113 across the width of the conveyor 100 to the detector 112 located at the opposite lateral edge of the conveyor. The light source 111 and detector 112 are arranged proximate the lower surface of the conveyor belt 101 so that the transmitted light 113 will pass as close as possible to a tray 10 as it passes between the conveyors 100, 200. In this embodiment, the light source 111 is arranged at one lateral side of the conveyor 100 and the detector 112 is located at the opposite lateral side of the conveyor 100 so that the light signal 113 extends across substantially the entire width of the conveyor 100 to provide maximum coverage and to accommodate trays entering at different lateral positions.

As mentioned above, the second conveyor 200 also includes an optical sensor 210 which, as with the first optical sensor 110, comprises a light source 211 at one lateral side of the conveyor and a detector 212 at the opposing lateral side of the conveyor, such that the light source 211 transmits a light signal 213 across substantially the entire width of the conveyor 200. In this embodiment, the second light source 211 and the second detector 212 are arranged such that the light signal 213 extends along a path proximate the upper surface of the lower conveyor belt 200. Again, arranging the optical sensor 210 in this manner ensures that the light signal is as close as possible to a tray 10 as it passes between the conveyors 100, 200.

In use, as a tray 10 is conveyed through the leak detection system 1 between the opposing conveyors 100, 200, it will experience an applied pressure as it is squeezed between the two conveyors. This applied pressure may cause gas to leak out of any breaches in the sealed container. As the tray 10 passes between the optical sensors 110, 210, the gas that is leaking from a breached container may permeate through the conveyor belts 101 or 102 through the openings and impinge upon the light signal 113 or 213 of the respective optical sensors 110, 210. This impinging of gas from inside the sealed container may thereby cause a variation in the composition of the gas through which the corresponding light signal is travelling. The detector 112 or 212 may thereby detect the change in gas composition as an increase or decrease in the strength of the light signal detected in the wavelength corresponding to an absorption spectra of said gas. This change in intensity detected at the detector may be used to infer that a tray located between the optical sensors contains a breach.

Both the first and second optical sensors 110, 210, are connected to a control unit 20 by respective wires 21, 22. In this embodiment, the control unit 20 is located within the upper conveyor and the wire connecting to the second optical sensor 120 extends out of the side of the upper conveyor 100, before being routed down and into the side of the second conveyor 200 to connect to the second optical sensor 210. In other embodiments, the control unit could be located outside of both conveyors. The control unit is connected to the detectors 112, 212 of the optical sensors 110, 210 and receives a signal indicative of gas composition of the gas impinging on the respective light signal. In this way, the control unit is able to process the gas composition data and determine the presence of a breach. For example, the control unit 20 may determine that there is a breach in the sealed food container 10 once a threshold value for $CO_2$ is exceeded, or when a certain rate of change of $CO_2$ is detected, if the container has a modified atmosphere rich in $CO_2$.

Not only will this embodiment allow for detection of breaches, but it may also be used to infer a type of upstream failure. In particular, this system may distinguish between a breach in the top of the container or in the bottom of the container. For example, only the first optical sensor 110 may detect a variation in gas composition, in which case it may be inferred that the breach is in the top of the container. Alternatively, the signals between the two optical sensors 110, 210 may be compared by the control unit 20 to determine which sensor detected the largest spike or drop in intensity, with the greater change being indicative of the breach being closer to said sensor. If, for example, an unusually high proportion of breaches are being detected in either the top or bottom of the container, this may be used to deduce that there is a particular type of upstream problem. For example, regularly breached container bottoms may be indicative of a problem with the lower traysealing tool or tray former. Alternatively, a high proportion of breaches in the tops of containers may be used to deduce a problem with the upper traysealing tool or with the film real.

Furthermore, in combination with information concerning the location of the container, this embodiment may be used to determine the location of the breach along the conveying direction of the container. For example, a light gate (not shown) may be arranged to detect a container passing between the first and second optical sensors 110, 210. The light gate signal may be received and the control unit 20 and compared with the signals from the optical sensors 110, 210 to determine the position of a breach along the conveying direction. For example, if a spike in $CO_2$ is detected by the first optical sensor and not the second optical sensor as the light gate is triggered by the container, it may be inferred that a breach is located along the upper leading edge of the container. If breaches are regularly detected in a particular location, this may be used to diagnose a fault in the upstream sealing systems.

Figure 5:
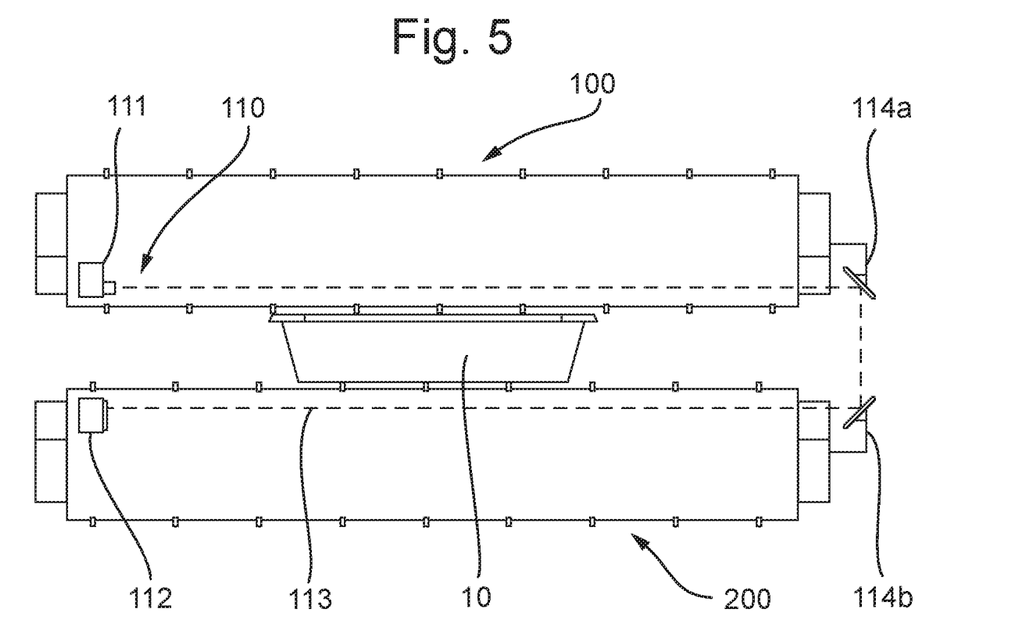
FIG. 5 shows an end view of a second leak detection with the conveyor belts being omitted to reveal the positioning of the optical sensors.

An alternative optical sensor arrangement is shown in FIG. 5. In this embodiment, only one optical sensor 110 is provided. In this embodiment, the optical sensor comprises a light source 111 located within the upper conveyor 100 and a detector 112 located in the lower conveyor 200. The light source 111 is located at one lateral edge of the conveyor and transmits a light signal 113, which travels along the width of the upper conveyor 100 and passes out the opposite lateral side of the conveyor 100. First and second mirrors 114a, 114b are provided which deflect this light signal down and into the second conveyor 200, i.e. between the upper and lower surfaces of the belt 201. The light signal travels across substantially the entire width of this second conveyor 200 and is received on a detector 112. The light source 111 is provided close to the lower surface of the upper conveyor belt 101 and the detector is located close to the upper surface of the lower conveyor belt 201 such that the light signal 113 will pass close to both the upper and lower surfaces of a tray 10 passing between the conveyors 100, 200. This arrangement, thereby, provides a single light signal that passes along a path that extends across both conveyors 100, 200. This embodiment reduces the number of optical sensor components required in order to achieve sensitivity to gas composition variations proximate both the upper and lower surfaces of the tray 10.

In FIG. 5, the control unit is not shown so that the arrangement of the light signal can be more clearly seen, but the control unit may be arranged inside the lower conveyor 200 and connected to the detector 112, for example.

The invention claimed is:

1. A leak detection system for detecting breaches in sealed food containers, the leak detection system comprising:
   a first optical sensor configured to transmit a light signal along a first testing path, wherein the first testing path is a path of the light signal, said first optical sensor being sensitive to gas composition variations; and
   a permeable pressing member configured to, in use, apply pressure to the sealed food container;
   wherein said first optical sensor is arranged such that at least a portion of the first testing path along which the light signal is transmitted is located within the permeable pressing member.

2. A leak detection system according to claim 1, further comprising a conveyor for conveying a sealed food container through the leak detection system.

3. A leak detection system according to claim 1, wherein the permeable pressing member is configured to apply pressure to the sealed food container while said sealed food container moves through the leak detection system.

4. A leak detection system according to claim 3, further comprising a conveyor for conveying a sealed food container through the leak detection system, wherein the permeable pressing member is arranged opposite the conveyor such that a sealed food contained may pass between the permeable pressing member and the conveyor.

5. A leak detection system according to claim 1, further comprising a control unit coupled to the first optical sensor, the control unit receiving a signal of the first optical sensor and determining the presence of a breach in a sealed food container based on the signal of the first optical sensor.

6. A leak detection system according to claim 5, wherein the permeable pressing member is configured to apply pressure to the sealed food container while said sealed food container moves through the leak detection system, and wherein the control unit is configured to receive information concerning the location of the sealed food container relative to the first optical sensor, wherein the control unit is configured to determine the location of a breach in the sealed food container based on the signal of the first optical sensor and the information concerning the location of the sealed food container.

7. A leak detection system according to claim 5, wherein the control unit is configured to determine a magnitude of a breach based on the signal of the first optical sensor.

8. A leak detection system according to claim 1, wherein the permeable pressing member comprises a first permeable conveyor belt.

9. A leak detection system according to claim 8, wherein the first permeable conveyor belt comprises an array of elements that project away from the surface of the conveyor belt for contacting the sealed food container and separating a body of the conveyor belt from the surface of the sealed food container.

10. A leak detection system according to claim 8, wherein the first optical sensor is arranged such that at least a portion of the first testing path is located within the first conveyor belt and extends across the width of the conveyor belt.

11. A leak detection system according to claim 2, wherein the conveyor is a permeable conveyor, and wherein the first optical sensor or a second optical sensor sensitive to gas composition variations is configured to transmit a second light signal across a second testing path, wherein said optical sensor is arranged such that at least a portion of the second testing path along which the second light signal is transmitted is located behind or within the permeable conveyor.

12. A leak detection system according to claim 11, wherein the permeable conveyor comprises a second permeable conveyor belt.

13. A leak detection system according to claim 12 wherein said optical sensor is arranged such that at least a portion of the second testing path is located within the second permeable conveyor belt and extends across the width of said conveyor belt.

14. A leak detection system according to claim 11, wherein a second optical sensor sensitive to gas composition variations is configured to transmit the second light signal across the second testing path, wherein the first optical sensor is sensitive to gas composition variations in the first testing path and the second optical sensor is sensitive to gas composition variations in the second testing path.

15. A leak detection system according to claim 14, further comprising a control unit coupled to the first optical sensor, the control unit receiving a signal of the first optical sensor and determining the presence of a breach in a sealed food container based on the signal of the first optical sensor, wherein the control unit is coupled to the second optical sensor and is configured to receive a signal from the second optical sensor, wherein the control unit is configured to determine the location of a breach based on the signal from the first optical sensor and the signal from the second optical sensor.

16. A leak detection system according to claim 15, wherein the control unit is configured to determine the location of a breach by comparing the signal from the first optical sensor and the signal from the second optical sensor.

17. A leak detection system according to claim 2, wherein the permeable pressing member is adjustably mounted over the conveyor such that a distance between the pressing member and the conveyor may be varied in order to accommodate different dimensions of sealed food containers.

18. A leak detection system according to claim 1, wherein the first optical sensor is mounted to said permeable pressing member.

19. A leak detection system according to claim 1, wherein the optical sensor(s) comprise one or more light sources configured to transmit the light signal and wherein each optical sensor comprises a detector sensitive to the light signal transmitted by said light source.

20. A method of detecting breaches in sealed food containers, the method comprising:
applying pressure to a sealed food container using a permeable pressing member;
detecting a variation in gas composition behind or within the permeable pressing member using a first optical sensor configured to transmit a light signal along a first testing path, wherein the first testing path is a path of the light signal;
wherein said first optical sensor is arranged such that at least a portion of the first testing path along which the light signal is transmitted is located within the permeable pressing member.

21. A leak detection system for detecting breaches in sealed food containers, the leak detection system comprising:
a first optical sensor configured to transmit a light signal along a first testing path, wherein the first testing path is a path of the light signal, said first optical sensor being sensitive to gas composition variations; and
a permeable pressing member configured to, in use, apply pressure to the sealed food container;
wherein said first optical sensor is arranged such that at least a portion of the first testing path along which the light signal is transmitted is located behind the permeable pressing member relative to a side of the permeable pressing member configured to come into contact with the sealed food container or is located within the permeable pressing member;
wherein the permeable pressing member comprises a first permeable conveyor belt;
and wherein the first permeable conveyor belt comprises an array of elements that project away from the surface of the conveyor belt for contacting the sealed food container and separating a body of the conveyor belt from the surface of the sealed food container.

* * * * *